United States Patent
Eicher et al.

(10) Patent No.: US 7,669,625 B2
(45) Date of Patent: Mar. 2, 2010

(54) ASYMMETRICAL PNEUMATIC TIRE

(75) Inventors: Marco Joseph Eicher, Schrondweiler (LU); Edouard Pierre Michel, Rollingen/Mersch (LU); Xavier Sebastien Benoit Fraipont, Ochain-Clavier (BE); Kenneth Jenner Powell, Vaux sur Sure (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 632 days.

(21) Appl. No.: 11/603,738

(22) Filed: Nov. 22, 2006

(65) Prior Publication Data

US 2008/0115868 A1  May 22, 2008

(51) Int. Cl.
- B60C 3/06 (2006.01)
- B60C 9/17 (2006.01)
- B60C 11/00 (2006.01)
- B60C 11/03 (2006.01)
- B60C 15/00 (2006.01)
- B60C 15/06 (2006.01)

(52) U.S. Cl. ............. 152/209.5; 152/209.8; 152/209.9; 152/455; 152/456; 152/543; 152/546; 152/554

(58) Field of Classification Search .................. 152/455, 152/456, 209.5, 209.8, 209.9, 543, 546, 554
See application file for complete search history.

(56) References Cited

U.S. PATENT DOCUMENTS

| | | |
|---|---|---|
| 3,339,610 A | 9/1967 | Fausti et al |
| 3,435,874 A | 4/1969 | Mirtain et al |
| 3,765,468 A | 10/1973 | Verdier |
| 4,377,193 A | 3/1983 | Smith |
| 4,766,940 A | 8/1988 | Yokoyama et al. |
| 5,529,104 A | 6/1996 | Delias et al. |
| 5,538,063 A | 7/1996 | Dwenger et al. |
| 5,735,979 A | 4/1998 | Secondari |
| 5,985,163 A | 11/1999 | Cha et al. |
| 6,267,166 B1 | 7/2001 | Secondari |
| 6,286,576 B1 | 9/2001 | Arakawa |
| 6,719,025 B2 * | 4/2004 | Caretta et al. ............ 152/209.5 |

FOREIGN PATENT DOCUMENTS

| | | | |
|---|---|---|---|
| DE | 1680455 | | 5/1966 |
| EP | 1184205 A2 | | 3/2002 |
| GB | 1115546 | * | 5/1968 |
| GB | 1115834 A | * | 5/1968 |

OTHER PUBLICATIONS

English machine translation of EP 1 184 205 A2, Mar. 6, 2002.*
U.S. Appl. No. 29/263,944, filed Aug. 1, 2006.

* cited by examiner

*Primary Examiner*—Adrienne C Johnstone
(74) *Attorney, Agent, or Firm*—Robert N. Lipcsik

(57) ABSTRACT

A pneumatic radial tire has a carcass and a tread. The carcass has at least one carcass reinforcing ply and opposing bead portions. Each bead portion has a bead core and a bead apex radially. The apexes in each bead portion having the same radial height (HA), as measured from a bead base line (B). The tire has a bead reinforcing ply comprising aramid fiber reinforcing cords located in only one bead portion of the tire, with the bead reinforcing ply being adjacent to the carcass reinforcing ply.

11 Claims, 5 Drawing Sheets

ASYMMETRICAL PNEUMATIC TIRE

FIELD OF THE INVENTION

The present invention is directed towards a pneumatic tire. More specifically, the present invention is directed towards a pneumatic tire with asymmetrical reinforcement in the lower sidewall and bead regions of the tire to enhance the high performance aspects of the tire.

BACKGROUND OF THE INVENTION

Pneumatic tires are conventionally constructed to have a symmetrical internal construction; the symmetry being centered on the lateral center, or equatorial plane, of the tire. Laboratory studies have shown that a majority of a tire's net cornering force is generated in the area of the shoulder on the inside of the direction of turn. Roll and lateral deflection to the outside tend to lift this inside shoulder, reducing the tire's cornering capability. In many vehicles, the vehicle's suspension system compensates for the reduced cornering capability by cambering of the vehicle wheels. In cambering, the top of a wheel and tire are tilted toward the center of the radius of the turn for maximum cornering force. Through the use of high wheel camber and toe angles, car suspensions are often designed in such a way that the load carried by a tire is not equally distributed between the inner and outer side of the tire. Given the fact that both sides of a tire are generally equal, this causes an asymmetric loading of the footprint leading to a side-to-side non-uniform shape that can be detrimental to the tire performance.

To compensate for these lateral forces, it has been known to form the tire with an asymmetric tread. This is accomplished in the tire of Mirtain, U.S. Pat. No. 3,435,874, and Verdier, U.S. Pat. No. 3,765,468.

SUMMARY OF THE INVENTION

The present invention is directed to a tire designed to compensate for wheel cambering and yield improved tire performance.

Disclosed herein is a pneumatic radial tire having two circumferential tire halves, with the tire comprising a carcass and a tread radially outward of the carcass. The carcass has at least one carcass reinforcing ply, opposing bead portions, and opposing sidewalls. The carcass reinforcing ply has a main portion extending between the opposing bead portions and a pair of turnup portions with each turnup portion extending from one end of the main portion. Each bead portion in the carcass has a bead core and a bead apex radially outward of each bead core with the apex located between the main portion and one turnup portion of the at least one reinforcing ply. In the tire of the invention, the apexes in each bead portion have the same radial height (HA), as measured from a bead base line (B). The tire has a bead reinforcing ply comprising aramid fiber reinforcing cords located in only one bead portion of the tire wherein the bead reinforcing ply is adjacent to the at least one carcass reinforcing ply.

In one aspect of the invention, the aramid fiber cords of the bead reinforcing ply have a denier in the range of 550 dTex to 3,300 dTex. The cords are inclined at an angle in the range of 30° to 60° relative to the circumferential direction of the tire. Additionally, the aramid fiber cords may have a TOW in the range of 550 to 9,900. In forming the bead reinforcing ply, the aramid fiber cords may have an end count of in the range of 10 to 30 ends per inch.

In one aspect of the invention, the bead reinforcing ply has a radially outer terminal point. The bead reinforcing ply radially outer terminal point is radially inward of the radially outer terminal point of the bead apex. Preferably, the radially outer terminal point of the bead reinforcing ply is approximately 70% to 200% of the radial height $H_A$ of the bead apex radially outer terminal point.

In different aspects of the invention, the bead reinforcing ply may be located in a variety of positions in the single bead portion. The ply may be located adjacent to the carcass reinforcing ply turnup portion, adjacent to the carcass reinforcing ply main portion, or directly adjacent to the bead apex.

In another aspect of the invention, the turnup portion of the carcass reinforcing ply in the same tire half as the bead portion having the bead reinforcing ply therein terminates at a radial height, relative to a bead base line of the tire, outward of the terminal end of the turnup portion in the opposing tread half, increasing the asymmetry of the tire construction.

In another aspect of the tire, at least one of the terminal points of the turnup portion of carcass reinforcing ply terminates at a distance HT from the maximum section width of the tire. The distance HT is in the range of 0% to 20% of the section height SH of the tire.

In another aspect of the invention, the carcass may comprise two carcass reinforcing plies. In such a tire, the terminal ends of both carcass reinforcing plies in the same tire half as the bead portion having the bead reinforcing ply therein may terminate at a radial height, relative to a bead base line of the tire, outward of the terminal ends of the turnup portions in the opposing tread half.

In another aspect of the invention, the asymmetric internal construction of the tire is paired with an asymmetrical tread. For such a tire and tread combination, due to the tread grooves, one tread half has a greater stiffness in one tread half in the circumferential direction, the lateral direction or in both directions of the tire than the opposing tread half. Preferably, the stiffer tread half is located in the opposite tire half as the bead portion having the bead reinforcing ply therein.

In another aspect of the invention, the tire tread may be formed of multiple rubber compounds. In such a tire, at least a portion of the tread compound in the same tire half as the bead portion having the bead reinforcing ply therein has a lower hardness or stiffness property than the tread compounds located in the opposing tread half.

DEFINITIONS

The following definitions are applicable to the present disclosure and are used consistently as defined below:

"Apex" means an elastomeric filler located radially above the bead core and between the plies and the turnup ply;

"Axial" and "axially" are used herein to refer to lines or directions that are parallel to the axis of rotation of the tire;

"Bead" or "Bead Region" means that part of the tire comprising an annular tensile member wrapped by ply cords and shaped, with or without other reinforcement elements such as flippers, chippers, apexes, toe guards and chafers, to fit the design rim;

"Bead base" means the portion of the bead that forms its inside diameter;

"Bead base line (BL)" means an imaginary line, perpendicular to the equatorial plane of the tire, from the intersection of the radially extending outside of the bead portion and the bead base;

"Bead core" means an annular hoop reinforcement in the bead region of the tire, commonly formed of steel wire, cords or cables;

"Circumferential" means lines or directions extending along the perimeter of the surface of the annular tire parallel to the Equatorial Plane (EP) and perpendicular to the axial direction;

"Design rim" means a rim having a specified configuration and width. For the purposes of this specification, the design rim and design rim widths are as specified by the industry standards in effect in the location in which the tire is made. For example, in the United States, the design rims are as specified by the Tire and Rim Association (TRA). In Europe, the rims are as specified in the European Tyre and Rim Technical Organization (ETRTO)—Standards Manual and the term design rim means the same as the standard measurement rims. In Japan, the standard organization is The Japan Automobile Tire Manufacturer's Association (JATMA);

"Equatorial plane (EP)" means the plane perpendicular to the tire's axis of rotation and passing through the center of its tread;

"Groove" means an elongated void area in a tread that may extend circumferentially or laterally about the tread in a straight, curved, or zigzag manner. Circumferentially and laterally extending grooves may be sub classified as a "sipe", "narrow," or "main." A "sipe" is a groove having a width in the range from about 0.2% to 0.8% of the compensated tread width, whereas a "narrow groove" has a width in the range from about 0.8% to 3% of the compensated tread width and a "main groove" has a width greater than 3% thereof. The "groove width" is equal to tread surface area occupied by a groove or groove portion, the width of which is in question, divided by the length of such groove or groove portion; thus, the groove width is its average width over its length;

"Maximum Sectional Width (SW)" is the maximum axial width of the tire as measured from one sidewall to the opposing sidewall;

"Radial" and "radially" are used to mean directions radially toward or away from the axis of rotation of the tire; and "Tire Sectional Height (SH)" is the maximum radial height of the tire as measured from the bead base line BL.

BRIEF DESCRIPTION OF THE DRAWINGS

The invention will be described by way of example and with reference to the accompanying drawings in which.

DETAILED DESCRIPTION OF THE DRAWINGS

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
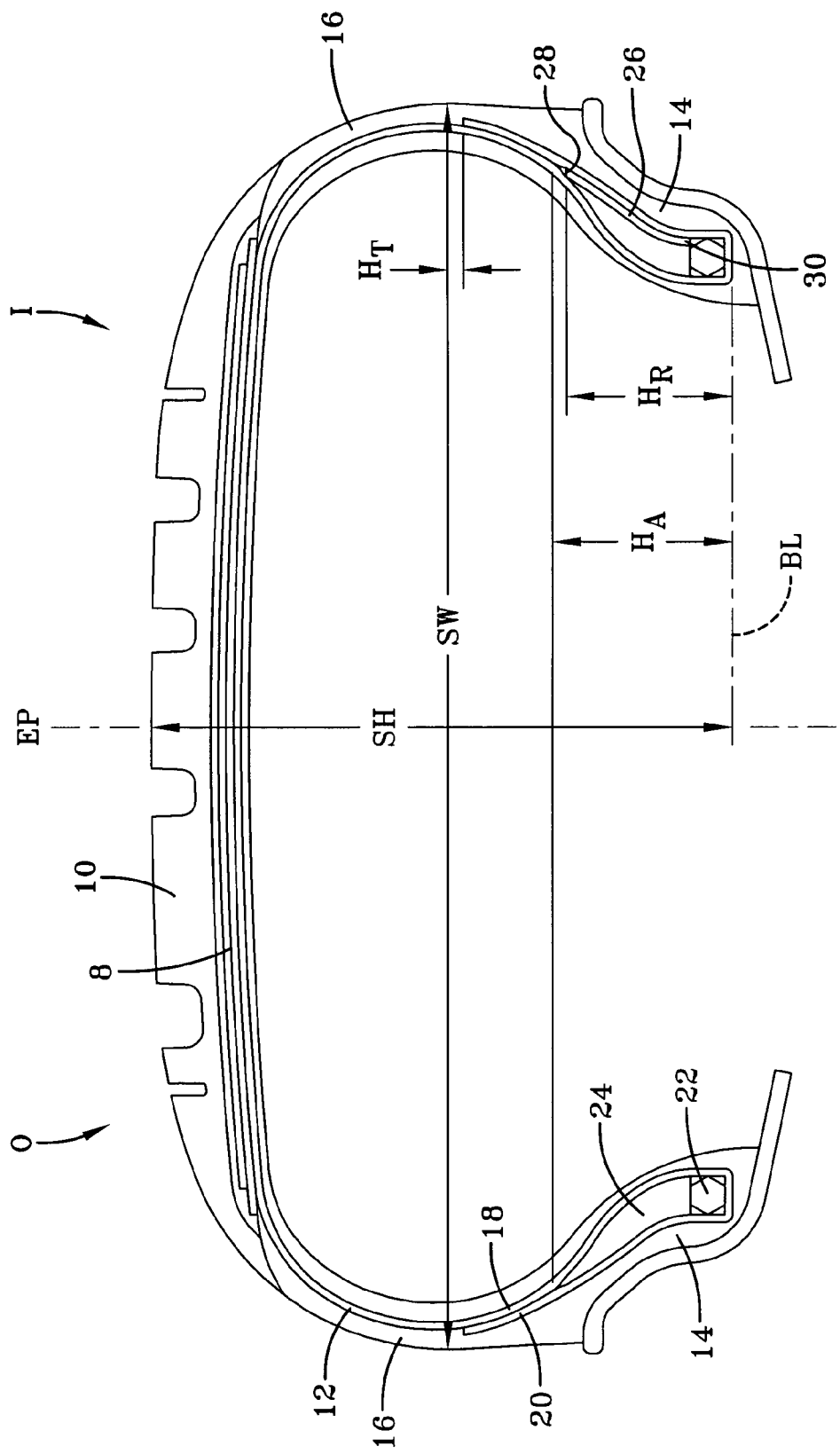
FIG. 1 is one embodiment of the present invention.

FIG. 1 illustrates a pneumatic tire in accordance with the present invention. The pneumatic tire is a low aspect radial tire, preferably designed for use as a high performance tire. The pneumatic tire has a carcass, a belt structure 8 radially outward of the carcass, and a tread 10 radially outward of the belt structure 8. The belt structure 8 may be any of the type conventionally used for a passenger vehicle tire, and generally will include two reinforcement plies of cords with overlay plies covering at least the axially outer edges of the individual belt reinforcement plies.

The carcass has at least one carcass reinforcing ply 12, a pair of opposing bead portions 14 and a pair of opposing sidewalls 16. The tire of FIG. 1 is illustrated as having one carcass reinforcing ply 12, but it is within the skill of those in the art to form the tire of FIG. 1 as a two ply carcass. The ply 12 has a main portion 18 extending through the opposing sidewalls 16 and two turnup portions 20 initiating in the bead portions 14. Each turnup portion 20 of the carcass reinforcing ply 12 extends from the main portion 18 of the carcass reinforcing ply 12, and is wrapped about a bead core 22 and a bead apex 24 in the bead portion 20; thus enveloping, at a minimum, the bead core 22 and the lower portion of the bead apex 24 in each bead portion 14. The turnup portion 20 in this embodiment terminates at a distance $H_T$ radially above or below the maximum section width SW of the tire; the distance $H_T$ is in the range of 0% to 20% of the section height SH.

In the opposing bead portions 14, the bead apexes 24 have the same radial height $H_A$, as measured from the bead base line BL. Located in only one bead portion 14 of the tire is a bead reinforcing ply 26. The bead reinforcing ply 26 is formed of calendered aramid fiber cords. The aramid fiber cords are inclined at an angle of 30°-60°, preferably 40°-50°, relative to the circumferential direction of the tire. Conventional chipper plies are formed of textile cords; herein aramid fiber cords provide a similar lightweight material, but have a tensile strength and breaking load strength greater than conventional textile materials.

The aramid fiber forming the aramid fiber cords in the bead reinforcing ply 26 have a denier in the range of 550 dTex to 3,300 dTex, with a preferred denier in the range of 400 to 1,700 dTex. The TOW range of the cords is 550 to 9,900, with a preferred range of 2,200 to 3,400. The cord has a Young's modulus of 8,000-70,000 KPa, with a preferred range of 16,000-50,000 KPa. The cord may have a tensile strength in the range of 125 to 1,500 N, preferably 250 to 800 N. Additionally, the cord has a maximum elongation in the range of 4 to 10%, preferably 6 to 9%.

In forming the bead reinforcing ply 26, the end count of the aramid fiber cords, commonly referred to as ends per inch (e.p.i), is dependent upon the cord TOW. The e.p.i. is in the range of 16 to 32, with a preferred range of 20 to 30.

In one embodiment of the invention, as illustrated, the bead reinforcing ply 26 is located within the turnup envelope and directly adjacent to the bead apex 24. The bead reinforcing ply 26 extends from the initial point near the bead core 22 to a radially outer terminal end 28 at a radial height $H_R$. The height $H_R$ is approximately 70% to 200%, preferably 70% to 125%, of the bead apex radial height $H_A$. The radially inner initial point 30 of the bead reinforcing ply 26 does not have any overlap with the bead core 22, but is preferably spaced from the radially outer surface of the bead core 22 by a distance of at least 1.5 mm; preventing the end of the bead reinforcing ply 26 from being pinched between the bead core 22 and the carcass reinforcing ply 12.

In alternative constructions, the bead reinforcing ply 26 may be located a) on the axially outer side of the carcass turnup portion 20 (see FIG. 2), b) on the axially inner side of the bead apex 24 between the bead apex 24 and the carcass ply main portion 18 (see FIG. 3A), or c) on the axially inner side of the carcass main portion 18 between the carcass ply 18 and a tire innerliner. The last construction is not illustrated herein, but constructing such a variation within the above limitations is within the skill of those in the art.

Figure 2:
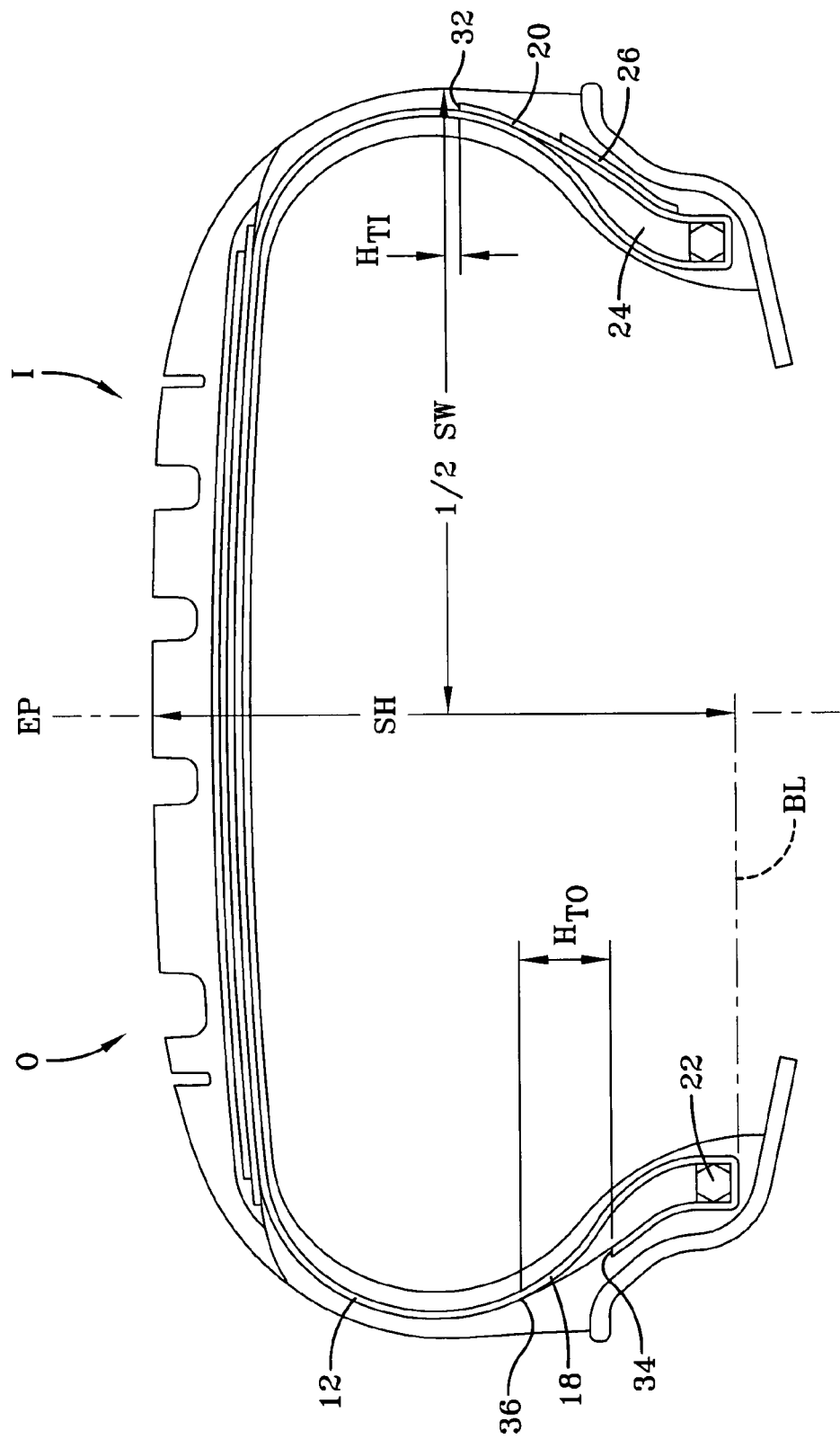
FIG. 2 is an alternative embodiment of the present invention.

FIG. 2 is an alternative embodiment of the internal construction of the tire. The carcass has a single reinforcing ply 12; however, the terminal ends 32, 34 of the ply 12 are asymmetrical relative to the tire equatorial plane. The carcass ply terminal end 32 in the inboard side I of the tire is radially outward of the carcass ply terminal end 34 in the outboard side O of the tire. This results in an increase in the spring rate of the outboard tire side and the ride comfort of the tire. The carcass ply terminal end 32 in the inboard side I of the tire is located at distance $H_{TI}$ of 0% to 20% of the tire section height SH from the maximum section width SW. The carcass ply terminal end in the outboard side O of the tire is distanced from the radially outer terminal end 36 of the bead apex 24 by a distance $H_{TO}$ at least 5%, preferably about 10-15% of the tire section height SH.

Similar to the first embodiment, the bead reinforcing ply 26 in the asymmetric tire of FIG. 2 may be located in a variety of locations in the inboard side bead portion 14 in addition to the illustrated location of being axially outward of the carcass reinforcing ply turnup portion 20. The bead reinforcing ply 26 may be between the apex 24 and the carcass reinforcing ply turnup portion 20 (see FIG. 1), between the apex 24 and the carcass reinforcing ply main portion 18 (see FIG. 3A), or between the carcass reinforcing ply main portion 18 and a tire innerliner.

Figure 3:
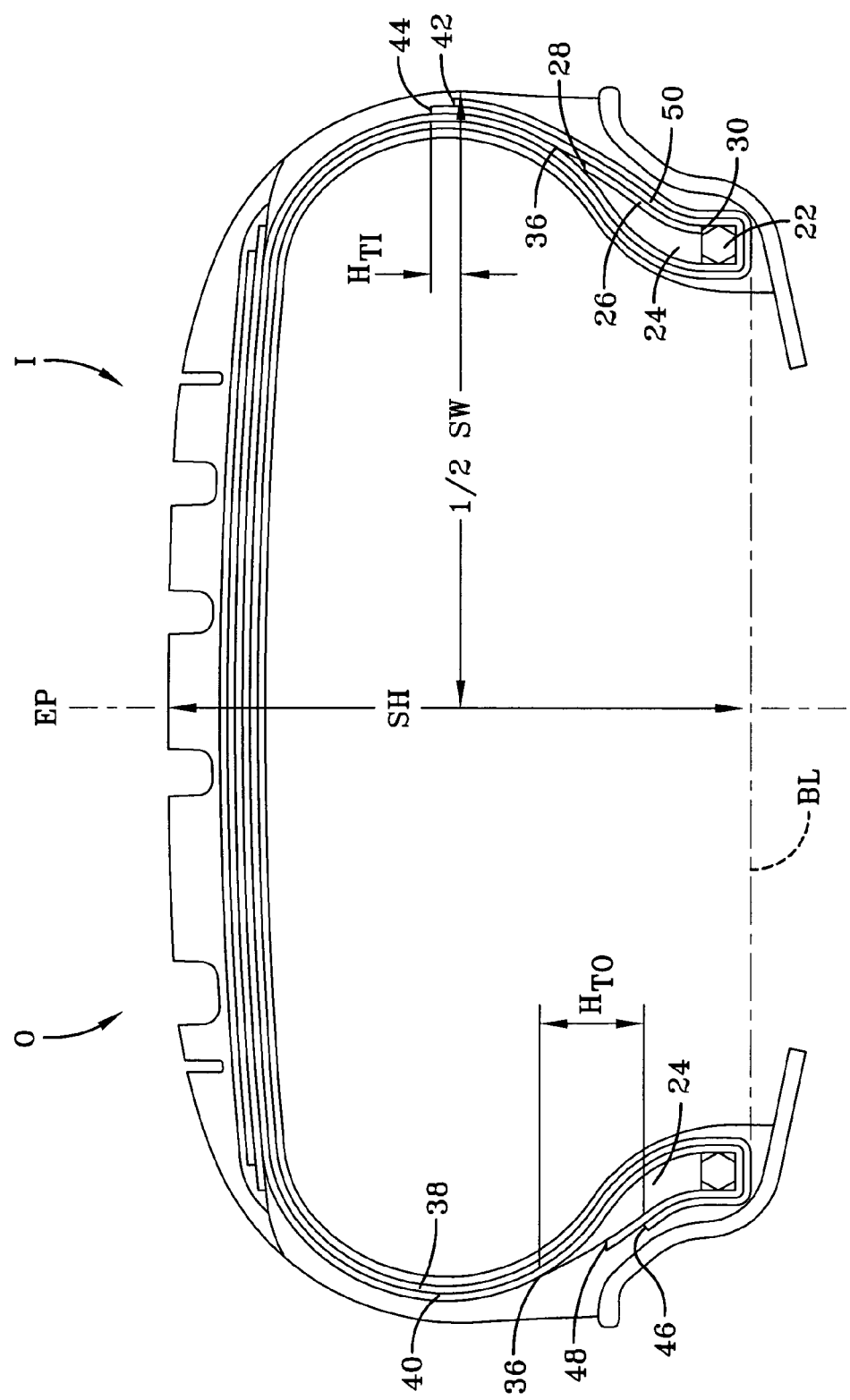
FIG. 3 is an alternative embodiment of the present invention.
Figure 3A:
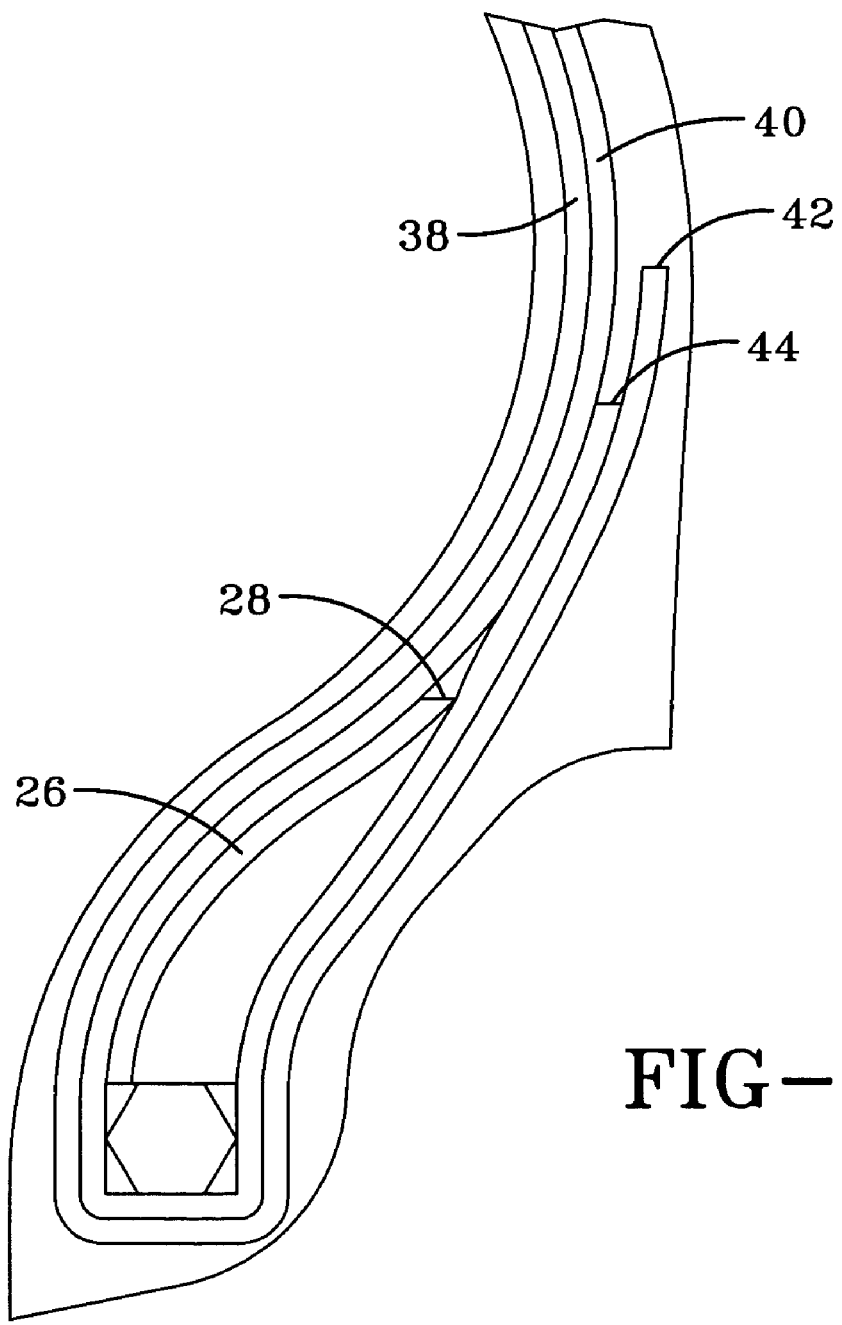
FIG. 3A is an alternative bead construction for the tire of FIG. 3.

FIG. 3 is an alternative embodiment of the internal construction of the tire. The carcass has two carcass reinforcing plies 38, 40, with each reinforcing ply having a main portion and a pair of turnup portions. In the inboard side I of the tire, the two plies 38, 40 terminate within the distance $H_T$ radially above or below the maximum section width SW of the tire; the distance $H_T$ being in the range of 0% to 20% of the tire section height SH. The terminal end 42 of the inner ply 38 may be radially inward of the terminal end 44 of the outer ply 40. Alternatively, the terminal end 42 of the inner ply 38 may be radially outward of the terminal end 44 of the outer ply 38 as seen in FIG. 3A, thereby completely enveloping all of the other ply endings 28, 44 and the apex 24.

In accordance with the invention, a bead reinforcing ply 26 is located in only one bead portion 14 of the tire. Preferably, the bead reinforcing ply 26 is located between the bead apex 24 and the turnup portion 50 of the outer carcass ply 40, having a radially outer terminal end 28 at a height HR. Similar to the previous embodiments, the bead reinforcing ply 26 may be located in various locations of the bead portion 14, with the requirement that the lower terminal end 30 of the bead reinforcing ply 26 being radially outward of the bead core 22.

In the outboard tire side O, both terminal ends 46, 48 of the plies 38, 40 are radially inward of the radially outer terminal end 36 of the bead apex 24. The terminal ends 46, 48 of the plies 38, 40 are spaced by a distance $H_{TO}$ of at least 5% of the tire section height SH below the radially outer terminal end 36 of the bead apex 24. The inner ply terminal end 46 in the outboard tire side O may be radially inward of the outer ply terminal end 48, as illustrated in FIG. 3, or may be radially outward of the outer ply terminal end 48, similar to that illustrated in FIG. 3A.

In the inventive tire, regardless of specific embodiment, while the carcass turnup portions and the ply reinforcing in each bead portion 14 is asymmetrical, the bead apexes 24 in both bead portions 14 are identical in construction, with both apexes 24 having the same radial height. The embodiment of FIG. 3 results in the outboard side of the tire having a greater spring rate than the inboard side of the tire.

Figure 4:
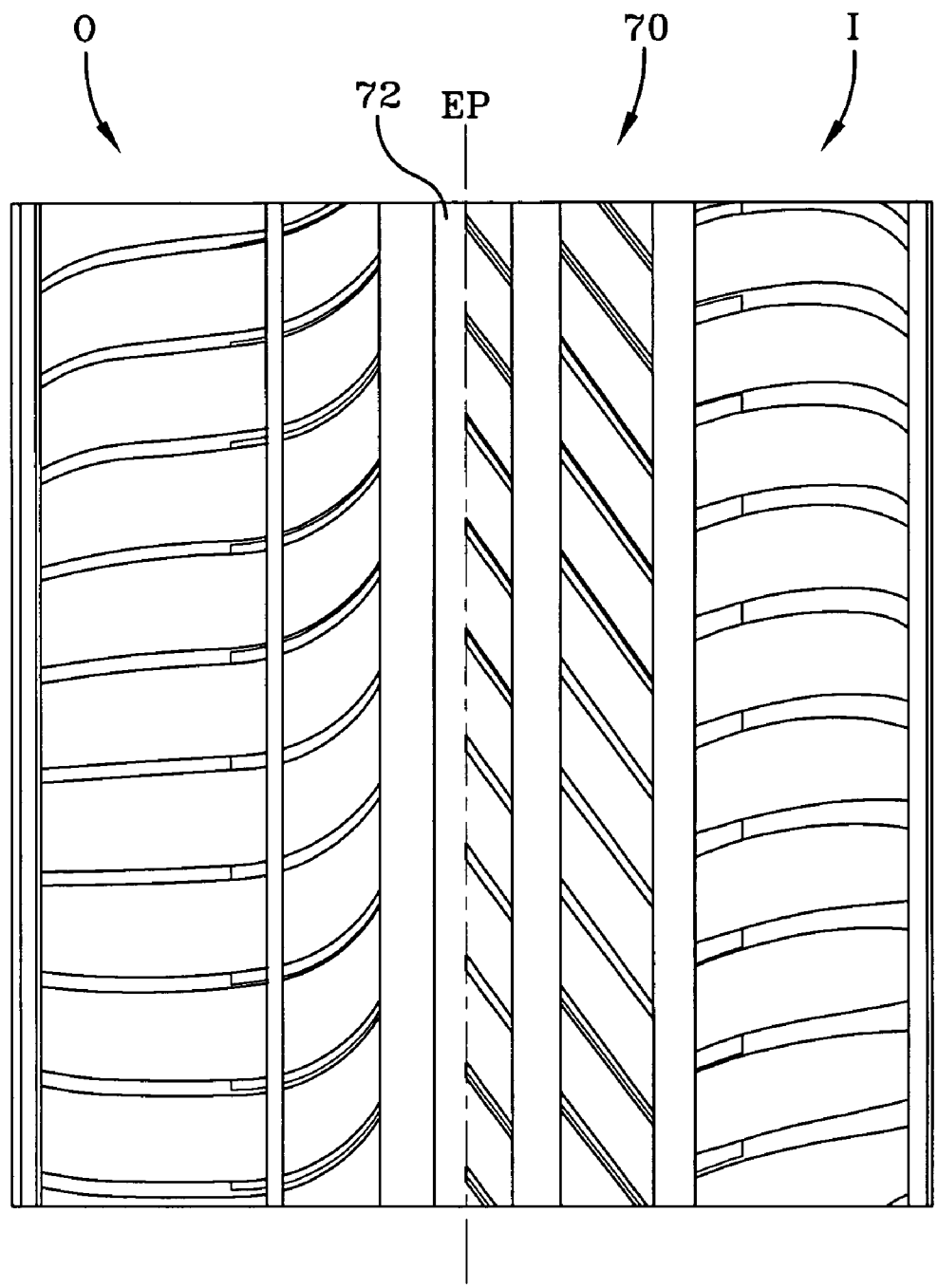
FIG. 4 illustrates a tire tread.

FIG. 4 illustrates a tire tread useful for any of the tires discussed above. The tread has an asymmetric design; though an asymmetric tread is not critical to the operation of the disclosed invention. In the illustrated tread 70, due to the continuous rib 72 and the minimally grooved shoulder tread, the tread half illustrated in the left side of FIG. 4, the tread half marked as O for outboard, has a greater tread stiffness, in at least the circumferential direction of the tire, than the opposing tread half. The outboard tread half may also have a greater stiffness in the lateral direction in comparison to the inboard side I of the tire tread. The combination of an asymmetric internal tire construction with an asymmetric tread construction results in a balancing of the stiffness rates in the adjacent tread halves. Thus, for the outboard side of the tire having a more flexible lower bead region, the tread is stiffer and the opposite holds for the inboard side of the tire.

The tread stiffness may also be affected by variations in the tread rubber compound selected for the tire. If it is desired to increase, or enhance the stiffness of the outboard O tread half, the tread rubber, or even just a tread base rubber, may be selected to have a greater hardness or stiffness characteristic than the inboard I tread half. If it is desired to equalize the tread half stiffness, the inboard I tread half may be the tread portion provided with a tread rubber or tread base rubber with a greater hardness or stiffness characteristic than the outboard O tread half.

Combining the asymmetric internal construction and an asymmetric tread construction results in a tire well suited to handle the camber effects of a vehicle and provide a tire that has improved ride comfort and handling.

What is claimed is:

1. A pneumatic radial tire having two tire halves, one on each side of a circumferentially extending equatorial plane (EP) of the tire, the tire comprising a carcass, a tread radially outward of the carcass, the carcass comprising at least one carcass reinforcing ply, opposing bead portions, and opposing sidewalls, the at least one carcass reinforcing ply having a main portion extending between the opposing bead portions and a pair of turnup portions, each turnup portion extending from one end of the main portion, each bead portion having a bead core and a bead apex radially outward of each bead core, the apex located between the main portion and one turnup portion of the at least one reinforcing ply, the apexes in each bead portion having the same radial height ($H_A$), as measured from a bead base line (BL), the tire having a section height (SH) measured from the bead base line to a surface of the tread at the equatorial plane (EP), the tire characterized by:

a bead reinforcing ply comprising aramid fiber reinforcing cords located in only one bead portion of the tire and no bead reinforcing ply located in the other bead portion of the tire, the bead reinforcing ply being adjacent to the at least one carcass reinforcing ply, the turnup portion of the at least one carcass reinforcing ply in the same tire half as the bead portion having the bead reinforcing ply therein terminates at a radial height, relative to the bead base line of the tire, outward of the terminal end of the turnup portion in the opposing tire half, the turnup portion of the at least one carcass reinforcing ply in the same tire half as the bead portion having the bead reinforcing ply therein terminates at a radial distance ($H_T$) from the maximum section width of the tire, the distance being in the range of 0 to 20% of the section height (SH) of the tire, the tread having a plurality of asymmetrically arranged transverse and circumferential grooves and a pair of adjacent tread halves, one on each side of the equatorial plane (EP), wherein one tread half has a greater stiffness due to the asymmetrical arrangement of the grooves in at least the circumferential direction of the tire than the opposing tread half, the stiffer tread half being located opposite to the tire half with the bead portion having the bead reinforcing ply therein, and the tread being formed of multiple rubber compounds and at least a portion of the tread compound in the same tire half as the bead portion having the bead reinforcing ply therein having a lower hardness property than any tread compound located in the opposing tread half.

2. The tire of claim 1 wherein the bead reinforcing ply is located adjacent to the at least one carcass reinforcing ply turnup portion.

3. The tire of claim 1 wherein the bead reinforcing ply is located adjacent to the at least one carcass reinforcing ply main portion.

4. The tire of claim 1 wherein the bead reinforcing ply is located directly adjacent to the bead apex.

5. The tire of claim 1 wherein the carcass comprises two carcass reinforcing plies.

6. The tire of claim 5 wherein the terminal ends of both carcass reinforcing plies in the same tire half as the bead portion having the bead reinforcing ply therein terminate at a radial height, relative to a bead base line of the tire, outward of the terminal ends of the turnup portions in the opposing tread half.

7. The tire of claim 1 wherein the aramid fiber cords in the bead reinforcing ply have a denier in the range of 550 dTex to 3,300 dTex and are inclined at an angle in the range of 30° to 60° relative to the circumferential direction of the tire.

8. The tire of claim 1 wherein the aramid fiber cords have a TOW in the range of 550 to 9,900 and have an ends per inch in the bead reinforcing ply in the range of 16 to 32.

9. The tire of claim 1 wherein the bead reinforcing ply has a radially outer terminal point, the bead reinforcing ply radially outer terminal point being radially inward of the radially outer terminal point of the bead apex.

10. The tire of claim 1 wherein the radially outer terminal point of the bead reinforcing ply is at a radial height $H_R$, the radial height $H_R$ of the bead reinforcing ply radially outer terminal being approximately 70 to 200% of the radial height $H_A$ of the bead apex radially outer terminal point.

11. The tire of claim 1 wherein the bead reinforcing ply has a radially inner terminal point, the bead reinforcing ply radially inner terminal point being radially outward of the radially outermost surface of the bead core.

* * * * *